No. 711,820. Patented Oct. 21, 1902.
A. C. BURDICK.
FLOATING FISH TRAP.
(Application filed Jan. 24, 1902.)

(No Model.) 3 Sheets—Sheet 2.

WITNESSES:

INVENTOR
Albert C. Burdick
BY
ATTORNEYS

No. 711,820. Patented Oct. 21, 1902.
A. C. BURDICK.
FLOATING FISH TRAP.
(Application filed Jan. 24, 1902.)
(No Model.) 3 Sheets—Sheet 3.

WITNESSES:

INVENTOR
Albert C. Burdick
BY
ATTORNEYS

UNITED STATES PATENT OFFICE.

ALBERT C. BURDICK, OF PORTLAND, OREGON.

FLOATING FISH-TRAP.

SPECIFICATION forming part of Letters Patent No. 711,820, dated October 21, 1902.

Application filed January 24, 1902. Serial No. 91,071. (No model.)

*To all whom it may concern:*

Be it known that I, ALBERT C. BURDICK, a citizen of the United States, and a resident of Portland, in the county of Multnomah and State of Oregon, have invented a new and Improved Floating Fish-Trap, of which the following is a full, clear, and exact description.

The purpose of the invention is to provide a novel construction of floating fish-trap made especially to fish with the tide, and, further, to provide a novel construction of the pot and first heart and means for flexibly and removably connecting them with supporting-scows.

Another purpose of the invention is to provide a floating fish-trap especially designed for salmon fishing in which the construction will be simplified and rendered more economic and effective than in similar traps of the present type.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
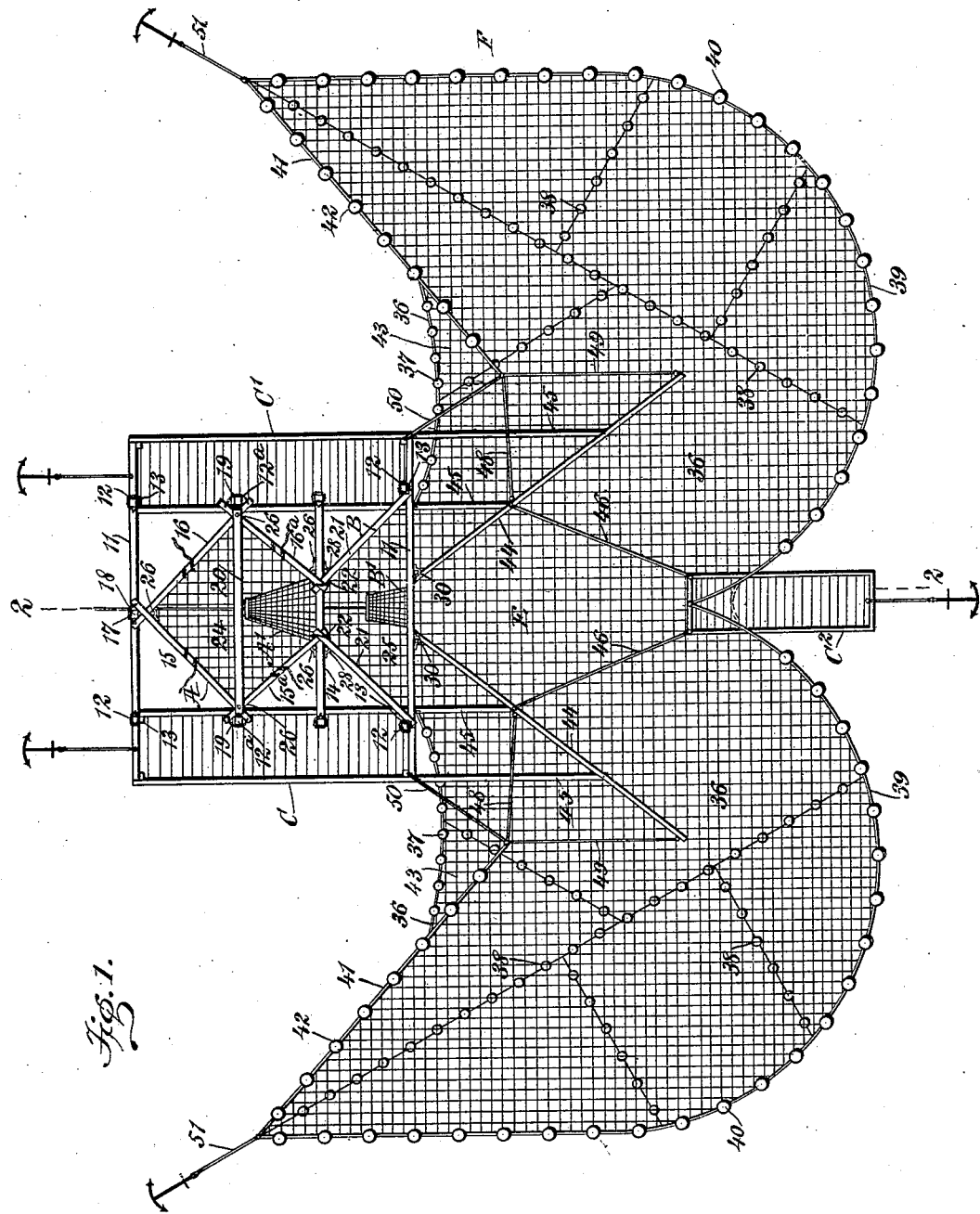
Figure 2:
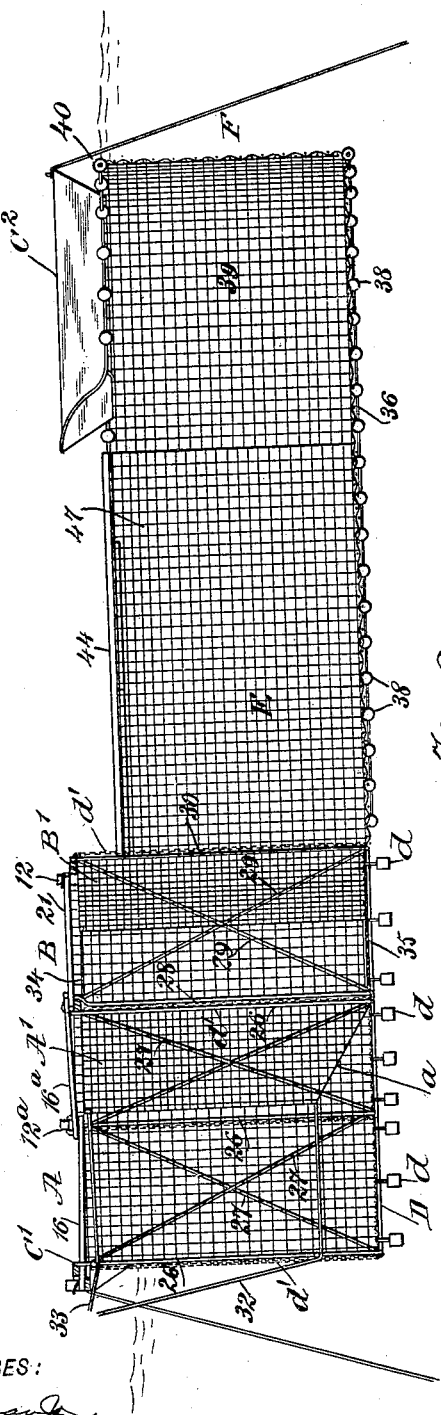
Figure 3:
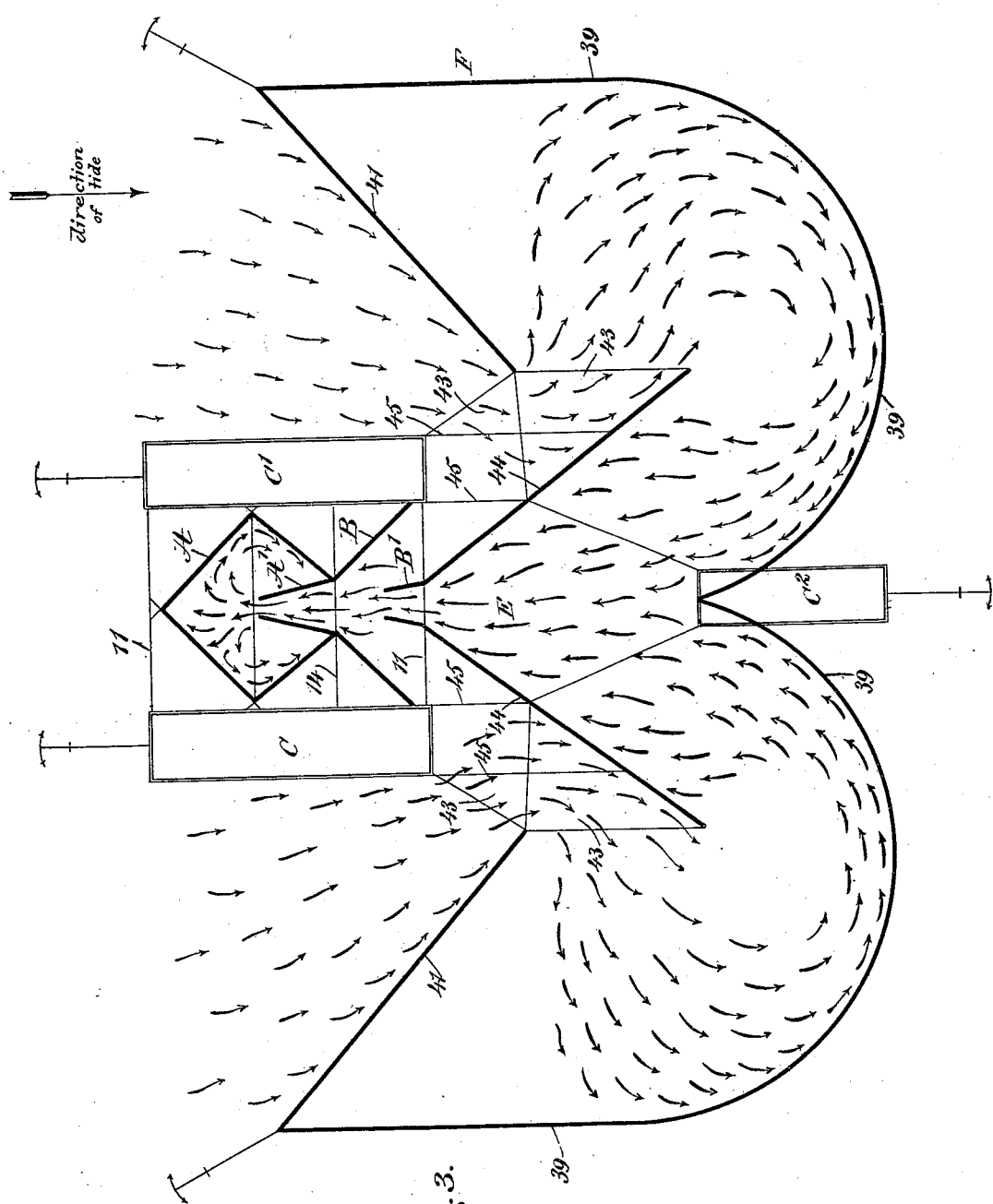

Figure 1 is a plan view of the improved trap. Fig. 2 is a central transverse section taken practically on the line 2 2 of Fig. 1; and Fig. 3 is a diagrammatic view of the trap, illustrating the operation of the same.

The trap is especially designed to fish with the tide, and the pot A and first heart B are yieldingly supported by two scows C and C', suitably anchored. A bottom skeleton frame D is preferably provided for the pot and first heart. This frame is of metal and has weights $d$ attached, as shown in Fig. 2. The frame D is attached to the scows by chains $d'$, as is also shown in Fig. 2. The pot is set on haul-downs and is pulled up in the usual manner. The position of the pot is novel, as one corner thereof directly faces the tide, and the pot is of diamond shape when viewed from the top. The pot hangs loosely, as does also the first heart B, which is of a half-diamond shape, both depending on the weights $d$ and guides and braces, hereinafter described, to keep them from twisting and getting out of shape. The scows C and C' are connected at the front and rear by cross-bars 11 through the medium of chain loops 12 or their equivalents passed around the standards 13, extending up from the decks of the scows at their inner sides, as is shown in Fig. 1, together with an intermediate cross-beam 14, attached in like manner to the scows, as is shown in Fig. 1.

The upper frame-section of the pot A comprises four strips of wood or metal 15, 15$^a$, 16, and 16$^a$ in diamond arrangement, the strips 15 and 16 crossing each other at their forward ends. The strip 15 crosses the strip 15$^a$ at one side of the pot, and the strip 16 and strip 16$^a$ cross each other at the opposite side of the pot; but the rear ends of the strips 15$^a$ and 16$^a$ are not crossed, as they rest with a space between them upon the intermediate cross-bar 14, connecting the scows. The crossed ends of the frame-strips 15 and 16 face the front of the trap or face the tide and have an attached chain 17, looped over a standard 18 at the central portion of the front cross-bar 11, while the crossed ends of the strips at the sides of the pot-frame are also provided with chain-loops 19, passed over standards 12$^a$, extending from the deck of the scows, as is shown in Fig. 1. The upper frame of the pot is completed by the addition of a cross-bar 20, removably attached to the sides of the frame.

The upper frame of the first heart consists of wooden or metal strips 21, constituting the sides of the frame, and the intermediate cross-bar 14 forms the forward part of the frame, while the rear cross-beam 11 may be said to constitute the rear of the frame. The forward ends of the side strips 21 cross the rear side strips 15$^a$ and 16$^a$ of the pot-frame, and both sets of these strips are flexibly secured to the intermediate cross-bar 14 by chain-loops 22 or the like. The rear ends of the side strips 21 rest upon the rear cross-bar 11 at or near its ends and are secured by chain-loops to the same standards 12 as are the ends of the said rear cross-bar.

The sides and bottom of the pot A are made of the customary netting 24, the sides being attached to the upper frame members 15, 15$^a$, 16, and 16$^a$, but not to the weighted frame D. The tunnel A' for the pot is located at the rear face of the pot, beneath the intermediate cross-bar 14. The netting 25 of the first heart consists of two side sections attached to the side strips 21 and the bottom section, the rear end of the first heart being practically open, and its forward end is open where the tunnel A' of the pot connects with the sides of the first heart, as is shown in Fig. 3. The bottom $a$ of the pot-tunnel A' is inclined downward in direction of the rear, as is shown in Fig. 2, in order that when fish enter the pot and dive down therein they can swim beneath the tunnel, and so tire themselves.

The net-body of the pot A is provided with a guide-rod 26, preferably of metal, on which the said net-body is mounted to slide by means of attached rings or the like. These guide-rods are located at the corner portions of the upper frame of the pot, as shown in Fig. 1, and extend downward, as shown in Fig. 2. The guide-rods 26 are attached to the weighted frame D and are stayed by cross-braces 27, as is shown in Fig. 2, and similar guide-rods 28 are provided for the netting of the first heart, strengthened by braces 29, and guide-rods 30 (shown in Figs. 1 and 2) are also provided for the tunnel B' of the first heart, upon which rods the tunnel slides, all of the guide-rods being attached to the said weighted frame D. The tunnel A' is operated by lines 32 and 33, connected, respectively, with the bottom and the top, as is shown in Fig. 2, and similar lines 34 and 35 are connected with the tunnel B'.

The second heart E joins the rear portion of the first heart and is located at the central part of the body or seine F, which is in the usual form of two connected wings. The seine is provided with a bottom 36, which at the central portion of its edge facing the tide is attached to the weighted frame D, and at each side of this point of attachment the forward edge of the bottom is provided with numerous leads 37, as shown in Fig. 1, and other strings of leads 38 are carried by the bottom 36 at each side of the second heart E. Vertical walls 39 of netting, having floats 40 attached, connect with the bottom of the seine at its rear and side edges, and at the front bottom edge of each wing of the seine, or the edge of the bottom facing the tide, vertical walls 41 of netting are located, provided with floats 42. These walls are also connected with the bottom of the seine and extend from the forward ends of the side walls of the seine at an inclination inward and rearward, as is shown in Fig. 1, crossing a part of the bottom of the seine and stopping short of the sides of the second heart E, thereby forming passages 43, facing the tide, leading from the leads employed to the sides of the wings of the seine, which are in open communication with the second heart. The second heart is produced by attaching floating cedar logs or booms 44 to the rear bar 11, connecting the forward scows C and C', the connection being made at each side of the center of the said bar. These floating booms extend rearward in opposite directions, one over each wing of the seine, and are connected between their ends with the scows C and C' by brace-beams 45. The booms 44 are likewise connected by ropes 46 with the ends of a third scow C², connected to the rear central portion of the seine, which rear portion of the seine is supported by attachment to the scow C², as shown in Figs. 1 and 3. The formation of the second heart is completed by attaching strips of netting 47 to the booms 44, as is shown in Fig. 2, which strips 47 extend to the bottom of the seine and are attached thereto. The inner ends of the front vertical walls 41 of the seine are held in position by rope braces 48 and 49, attached to the booms 44, and braces 50, attached to the rear portions of the forward scows. Web-leads 51, provided with suitable floats and anchors, extend from the forward corners of the seine twelve hundred feet or more, running mostly in direction of the tide.

In Fig. 3 I have illustrated by arrows the direction which the fish take from the leads to enter the pot, entering the second heart first, then the first heart, and finally the pot. It will be observed that this trap strictly fishes with the tide and that all the communications between the trap and the scows are yielding, as are likewise the communications between the forward scows.

The trap is set and emptied in the same manner as all regular driven traps; but the weighted frame and connected guides enable these operations to be more quickly and satisfactorily performed than has been possible heretofore, as the frame provides a stable pendent support upon which to work, and yet such support is free to swing under the action of the water. The usual downhauls are attached to the netting of the heart and pot, passing over suitable guides on the frame D or its connections, and by means of these downhauls the netting composing the heart and pot is drawn to a close engagement with the frame D. When the pot is to be raised to empty the fish therefrom, the ropes holding it down are untied and the usual lift-ropes connected with the pot are drawn upward, bringing the pot to the surface of the water, where the caged fish are scooped out into scows or other vessels.

Having thus described my invention, I claim as new and desire to secure by Letters Patent—

1. In floating fish-traps, forward floats facing the tide and yieldingly connected, a seine carried by the floats having inlets directly facing the tide, leads running substantially with the tide, an immersed weighted frame having flexible connection with the floats, a pot, a first and a second heart, the netting of the pot and first heart extending to the weighted frame, guide-rods for the netting of the pot and first heart, which guide-rods are carried by the frames of said parts, floating booms extending rearward in opposite directions from the seine, a netting extending downward from the booms, forming the second heart, and a rear float supporting the seine and flexibly connected with the boom, all being combined to fish with the tide, substantially as described.

2. In a floating fish-trap, the combination with forward floats facing the tide and yieldingly connected, a seine carried by the floats, having inlets directly facing the tide and leads running substantially with the tide, and an immersed weighted frame having flexible connection with the floats, of a pot diamond-shaped in plan, a first heart half-diamond shaped in plan, connected with the pot, the netting of the pot and first heart extending to the weighted frame, guide-rods for the netting of the pot and first heart, carried by their frames, which guide-rods are attached to the weighted frame, and a rear float connected with the seine, substantially as described.

3. In a floating fish-trap, the combination with forward floats facing the tide and yieldingly connected, a seine carried by the floats, having inlets directly facing the tide and leads running substantially with the tide, and an immersed weighted frame having flexible connection with the floats, of a pot diamond-shaped in plan, a first heart, half-diamond shaped in plan, connected with the pot, the netting of the pot and first heart extending to the weighted frame, guide-rods for the netting of the pot and first heart, carried by their frames, which guide-rods are attached to the weighted frame, floating booms extending rearward in opposite directions from the seine, a netting extending downward from the booms, forming a second heart, a rear float connected with the seine, and a flexible connection between the booms and the rear float, substantially as described.

4. A floating fish-trap, comprising forward floats facing the tide and yieldingly connected, a rear float also facing the tide, a pot, a first and a second heart, a seine provided with leads running substantially with the tide, the said parts having communication with each other and a yielding connection with the forward and rear floats, and a weighted frame beneath the pot and first heart, having guided connection therewith and yieldingly supported from the forward floats, all combined to fish with the tide, substantially as described.

In testimony whereof I have signed my name to this specification in the presence of two subscribing witnesses.

ALBERT C. BURDICK.

Witnesses:
J. FRED ACKER,
JNO. M. RITTER.